(12) United States Patent
Hulme et al.

(10) Patent No.: US 8,008,079 B2
(45) Date of Patent: Aug. 30, 2011

(54) SYSTEM AND METHOD FOR FERTILIZER SELECTION

(75) Inventors: Fred Hulme, Amherst, MA (US); Tina Marshall, Marysville, OH (US)

(73) Assignee: Everris International B.V., Heerlen (NL)

( * ) Notice: Subject to any disclaimer, the term of this patent is extended or adjusted under 35 U.S.C. 154(b) by 0 days.

(21) Appl. No.: 11/969,880

(22) Filed: Jan. 4, 2008

(65) Prior Publication Data

US 2008/0220529 A1    Sep. 11, 2008

Related U.S. Application Data

(60) Provisional application No. 60/879,029, filed on Jan. 5, 2007.

(51) Int. Cl.
*G01N 33/18*    (2006.01)
(52) U.S. Cl. ............................................ 436/39; 436/73
(58) Field of Classification Search .................. None
See application file for complete search history.

(56) References Cited

U.S. PATENT DOCUMENTS 6,553,299 B1 *    4/2003    Keller et al. ................... 701/50

OTHER PUBLICATIONS

Banks et al. "Effects of Water Sources and Fertilizers on Peanut Plants in the Greenhouse". Proc Okla Acad Sci. 1971. vol. 51, pp. 47-50.*
Reynolds et al. "Major, minor, and trace element chemistry of surface waters in the Everest region of Nepal". 1995. Biogeochemistry of Seasonally Snow-Covered Catchments. IAHS Publ. No. 228, pp. 405-412.*

* cited by examiner

*Primary Examiner* — Yelena G Gakh
*Assistant Examiner* — David Weisz
(74) *Attorney, Agent, or Firm* — Hunton & Williamms LLP

(57) ABSTRACT

A system, method and computer readable program is disclosed for facilitating the selection of a fertilizer. The basis for selecting the fertilizer includes determining the water type based on the water chemistry and taking into consideration the crop type that is to be grown.

10 Claims, 17 Drawing Sheets

| Defining Water Types | Alkalinity | Calcium | Magnesium |
|---|---|---|---|
| Water Type 1 110 | Very Low Alkalinity: 0 to 60 ppm | 0 to 60 ppm | Less than 30 ppm |
| Water Type 2 120 | Moderately Low Alkalinity: 60 to 150 ppm | 0 to 60 ppm | Less than 30 ppm |
| Water Type 3 130 | Moderately High Alkalinity: 150 to 200 ppm | 50 ppm or greater | Less than 30 ppm |
| Water Type 4 140 | Very High Alkalinity: 200 to 240+ ppm | 50 ppm or greater | Less than 30 ppm |

FIG. 1

ABC Selection System™ Classification List

A (Stand Alone) Products ---310

| N | P | K | New Brand | New Name | ICON | Ideally Suitable for Water Type Range |
|---|---|---|---|---|---|---|
| 13 | 2 | 13 | Peters Excel | Plug & Bedding Plant Special | A | Type 1 to 2 |
| 13 | 2 | 13 | Peters Excel | Plug & Bedding Plant Special Canada | A | Type 1 to 2 |
| 15 | 2 | 20 | Peters Excel | Pansy, Salvia & Vinca | A | Type 1 to 2 |
| 15 | 5 | 15 | Peters Excel | Cal-Mag Special | A | Type 2 |
| 15 | 5 | 15 | Peters Excel | Cal Mag Special Canada | A | Type 2 |
| 17 | 3 | 17 | Peters Pro | Peat Lite Neutral Cal-Mag | A | Type 1 to 2 |

B (Base) Products ---320

| N | P | K | New Brand | New Name | ICON | Ideally Suitable for Water Type Range |
|---|---|---|---|---|---|---|
| 21 | 5 | 20 | Peters Excel | Multi Purpose | B | Type 2 to 4 |
| 21 | 5 | 20 | Peters Excel | Multi Purpose Canada | B | Type 2 to 4 |
| 15 | 16 | 17 | Peters Pro | Peat Lite Special | B | Type 2 to 4 |
| 15 | 16 | 17 | Peters Pro | Peat Lite Special Canada | B | Type 2 to 4 |
| 15 | 5 | 25 | Peters Pro | Peat Lite Flowering Crop Special | B | Type 1-4 |
| 15 | 5 | 25 | Peters Pro | Peat Lite Flowering Crop Special Canada | B | Type 1-4 |
| 18 | 8 | 17 | Peters Pro | Peat Lite High Mag Special | B | Type 1-4 |
| 18 | 8 | 17 | Peters Pro | Peat Lite High Mag Special Canada | B | Type 1-4 |
| 20 | 2 | 20 | Peters Pro | Peat Lite Low Phos Special | B | Type 1 to 4 |
| 20 | 10 | 20 | Peters Pro | Peat Lite Special | B | Type 1 to 4 |
| 20 | 10 | 20 | Peters Pro | Peat Lite Special Canada | B | Type 1 to 4 |
| 20 | 20 | 20 | Peters Pro | GP | B | Type 2 to 4 |
| 20 | 20 | 20 | Peters Pro | GP No Dye | B | Type 2 to 4 |
| 20 | 20 | 20 | Peters Pro | GP Canada | B | Type 2 to 4 |
| 20 | 10 | 20 | Peters Pro | GP | B | Type 1 to 4 |
| 15 | 3 | 25 | Peters Pro | Peat Lite Flowering Crop Special Plus Iron | B | Type 1 to 4 |
| 24 | 8 | 16 | Peters Pro | Foliage Special | B | Type 1 to 4 |
| 24 | 8 | 16 | Peters Pro | Foliage Special Canada | B | Type 1 to 4 |

B (Specialty) Products ---330

| N | P | K | New Brand | New Name | ICON | Ideally Suitable for Water Type Range |
|---|---|---|---|---|---|---|
| 5 | 11 | 26 | Peters Pro | Hydroponic Special | B | Type 1 to 4 |
| 10 | 30 | 20 | Peters Pro | Peat Lite Plant Starter | B | Type 2 to 4 |
| 10 | 30 | 20 | Peters Pro | Peat Lite Plant Starter Canada | B | Type 2 to 4 |
| 13 | 2 | 13 | Peters Pro | Plug & Bedding Plant Special, No Minors, ND | B | Type 1 to 2 |
| 20 | 10 | 20 | Peters Pro | Peat Lite Special No Boron | B | Type 1 to 4 |
| 21 | 5 | 20 | Peters Excel | Multi Purpose No Boron | B | Type 2 to 4 |

C (Customizing Components) Products ---340

| N | P | K | New Brand | New Name | ICON | Ideally Suitable for Water Type Range |
|---|---|---|---|---|---|---|
| 10 | 0 | 0 | Peters Excel | Magnitrate Special | C | Type 1 to 4 |
| 15 | 0 | 15 | Peters Pro | Peat Lite Dark Weather Feed | C | Type 1 to 2 |
| 15 | 0 | 15 | Peters Pro | Peat Lite Dark Weather Feed Canada | C | Type 1 to 2 |
| 21 | 7 | 7 | Peters Pro | Acid Special | C | Type 3 to 4 |
| 0 | 0 | 0 | Peters Pro | S.T.E.M. No Dye (Soluble Trace Element Mix) | C | Type 1 to 4 |

The Scotts Testing Lab can help you determine your exact water type. Call 1-800-HORTLAB for water, growing media or plant tissue testing.

Directions for Use

Selecting the correct fertilizer program – test your irrigation water first, then select a suitable water soluble fertilizer program based on the irrigation water quality and the type of crops grown. The chemical composition of the irrigation water applied to crops has a major influence on the nutrients available to plants in the long term. The Scotts Testing Lab can help you determine your exact water type (Call 1-800-HORTLAB for water, growing media or plant tissue testing). Once the test results are completed, Scotts has an experienced team of horticultural professionals who can review the data and provide informed fertilizer recommendations to improve your nutritional systems.

Selecting the correct concentration – the correct fertilizer concentration for a particular operation will depend on a number of factors including: feeding frequency, crop type, crop stage, growing media, pot size, leaching fraction and environmental conditions. Generally fertilizer should be applied at concentrations necessary to sustain optimal root zone nutrient levels and quality plant growth. Continuous feeding is recommended over periodic or pulse feeding as this practice provides a more uniform and optimal feed program. See the tables below for The Scotts Company's general recommendations for crop types and injection ratios. Consult your local Scotts' expert for more details.

Mixing fertilizer – most growers make up concentrate solutions in a stock tank and use an injector system to achieve the correct final concentration. For best results in this situation: 1. determine correct weight of fertilizer to add to desired volume, 2. add water to about 1/3 of the tank volume, 3. add mineral acid only if necessary (addition may be required with alkalinity levels greater than 250 mg/L calcium carbonate.), 4. add fertilizer, 5. stir vigorously and 6. top off the tank volume with water.

Solubility – all product components are completely water soluble. A number of factors will determine how fast this material will completely dissolve: desired concentration, temperature of the irrigation water, agitation, time, irrigation water quality, the fertilizer itself and compatibility of other components in the stock tank. Each product has a stated maximum solubility that is determined under ideal lab conditions — it is physically impossible to maintain solubility above this value. Do not mix incompatible products or additives in the same stock tank.

WSF appearance – this product is composed on a number of components and product may appear ground and uniform in appearance or quite heterogeneous. Tracer dye color intensity, quality and distribution may appear variable in the bag; but once product is diluted in a stock tank colorant level should be consistent.

Storage – open bags should be sealed. Product may take on moisture from the atmosphere and become soupy over time or cake up (become hard). As long as bags are properly re-sealed, this should in no way diminish nutrient content of the fertilizer. Store product in a cool, dry environment.

Monitoring – use the Scotts Testing Laboratory for more reliable media, solution and tissue test results. Injector monitoring and maintenance will help ensure that you are feeding at optimal levels. Weekly on-site measurements of fertilizer solution and crop EC and pH can be a valuable tool in managing your crop. A follow up program of complete media analysis (and tissue in problem-solving situation) should be initiated to optimize your nutritional program. Consult your local Scotts' expert for more details.

---

This product is covered by one or more of the following U.S. Patents or foreign counterparts thereof; 5,171,349; 5,395,418; 5,492,553.

(For Continuous Liquid Feed Programs)

Guaranteed Analysis...........................................F1143
Total nitrogen (N) ..............................................15%
  1.20% ammoniacal nitrogen
  11.75% nitrate nitrogen
  2.05% urea nitrogen
Available Phosphate ($P_2O_5$)................................5%
Soluble potash ($K_2O$)........................................15%
Calcium (Ca)......................................................5%
Magnesium (Mg) (Total).......................................2%
  2.0% water soluble magnesium (MG)
Boron (B).......................................................0.0015%
Copper (Cu)....................................................0.007%
  0.0075 water soluble copper (Cu)
Iron (Fe) .......................................................0.075%
  0.0075% chelated iron (Fe)
Manganese (Mn) (Total)....................................0.037%
  0.037% water soluble manganese (Mn)
Molybdenum (Mo).............................................0.007%
Zinc (Zn).......................................................0.040%
  0.040% water soluble zinc (Zn)

Derived from: ammonium nitrate, calcium nitrate, potassium nitrate, urea phosphate, magnesium nitrate, boric acid, copper sulfate, iron EDTA, manganese sulfate ammonium molybdate, zinc sulfate Potential basicity: 150 lbs. calcium carbonate equivalent per ton.

Information regarding the contents and levels of metals in this product is available on the internet at http://www.regulatory-info-sc.com.

WARNING: This fertilizer contains more than .001% molybdenum (Mo). The application of fertilizing materials containing molybdenum (Mo) may result in forage crops containing levels of molybdenum (Mo) which are toxic to ruminant animals.

SAFETY INSTRUCTIONS:
FOR SAFETY INSTRUCTIONS, REFER TO THE MATERIAL SAFETY DATA SHEET. CALL 1-800-492-8255

WARNING: MAY BE HARMFUL IF SWALLOWED OR INHALED. MAY CAUSE IRRITATION.
- AVOID CONTACT WITH EYES, SKIN AND CLOTHING.
- WASH THOROUGHLY AFTER HANDLING.
- AVOID BREATHING DUST.
- DO NOT SWALLOW.

FIRST AID: IN CASE OF CONTACT, IMMEDIATELY FLUSH WITH PLENTY OF WATER FOR AT LEAST 15 MINUTES. CALL A PHYSICIAN; FLUSH SKIN WITH WATER. (WASH CLOTHING BEFORE REUSE.)

SPILLS AND DISPOSAL:
IF SPILLED, ABSORB WITH AN INERT NONCOMBUSTIBLE MATERIAL AND REMOVE FOR DISPOSAL. DISPOSE OF ALL WASTE IN ACCORDANCE WITH APPLICABLE GOVERNMENT REGULATIONS.

FOR PROFESSIONAL USE ONLY. KEEP OUT OF REACH OF CHILDREN.

---

Limitation Of Liability Fertilizer and Plant Protection Products

IMPORTANT NOTICE FROM THE SCOTTS COMPANY LLC AND SCOTTS-SIERRA HORTICULTURAL PRODUCTS COMPANY ("SCOTTS").

PLEASE READ BEFORE USE

By using this product, user or buyer accepts the conditions, disclaimer of warranties and limitations of liability. Read the entire directions for use, conditions of warranties and limitations of liability before using this product. If terms are not acceptable, return the unopened product container at once for full refund.

CONDITIONS: This product has been researched to provide necessary data to supports its uses listed on the label. The directions for use of this product are believed to be adequate and the user or buyer must always follow the label directions carefully and exercise judgment and caution when using this product under their growing conditions. However, it is impossible to eliminate all risks associated with the use of this product. Crop injury, ineffectiveness, unsatisfactory or substandard results or other unintended consequences may result because of such factors as weather conditions, presence or absence of other materials, or the manner of use or application, all of which are beyond the control of Scotts. All such risks shall be assumed by the user or buyer.

WARRANTY: This product corresponds to all claims and descriptions set forth on the label and, subject to the conditions set forth above, is reasonably fit for use for any purpose for which it is intended. Scotts recognizes that the rights and remedies of the user or buyer are subject to the provisions of the applicable state law, but makes no other warranties or representations, express or implied, of merchantability or of fitness for a particular purpose or otherwise, that extend beyond the statements made on this label. No agent of Scotts is authorized to make any warranties beyond those contained herein or to modify the warranties contained therein. Subject to the user's or buyer's rights and remedies under the applicable state law, Scotts disclaims any liability whatsoever for special, incidental or consequential damages resulting from the use or handling of this product.

LIMITATIONS OF LIABILITY: Subject to the user's or buyer's rights and remedies under the applicable state law, the exclusive remedy of the user or buyer and the liability of Scotts or its affiliates, for any and all losses, injuries or damages resulting from the use or handling of this product, whether in contract, warranty, tort, negligence, strict liability or otherwise, shall not exceed the purchase price paid by the user or Buyer for the quantity of this product involved or at Scotts' election, the replacement of the product. Subject to the user's or buyer's rights and remedies under the applicable state law, any and all claims or actions related to the use or handling of this product must be commenced within one (1) year from the date the product was purchased.

To request additional information, please contact your Scotts Distributor or call Scotts Customer Service at 1-800-492-8255.

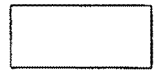 

FIG. 4B

SOLUTION ANALYSIS

ACCT # 1740360
NAME The Scotts Co/P Trump
ADDRESS 6 Summit Rd.
CITY/STATE/ZIP York, PA 17403
PHONE 717-880-6714
FAX 1,7177412135
E-MAIL philip.trump@scottsco.com DATE RECEIVED 03-Jun-2005
DATE COMPLETE
TURN AROUND
LAB I.D. 05702270
SAMPLE I.D. BERLINS CLEARWATER Date Sample Taken: 6/1/05
Sample Is: Water
Water Source: Surface Water  Stream
Water Treated: No Treatment
Concerns/Problems: Poor Plant Growth
20-10-20
Injector/Ration: Dosatron
Comments: JACK'S PROFESSIONAL 1:64

| TEST | | | RESULTS | TEST | | | RESULTS |
|---|---|---|---|---|---|---|---|
| Soluble Salts | | mmhos/cm | 0.17 | Copper | Cu | ppm | 0.10 |
| pH | | | 7.30 | Zinc | Zn | ppm | 0.10 |
| Alkalinity | | ppm | 40.14 | Molybdenum | Mo | ppm | 0.20 |
| Calcium | Ca | ppm | 17.00 | Aluminum | Al | ppm | 0.01 |
| Magnesium | Mg | ppm | 6.00 | Nitrate | $NO_3\text{-}N$ | ppm | 1.71 |
| Sodium | Na | ppm | 7.00 | Ammonium | $NH_4\text{-}N$ | ppm | 0.96 |
| Chloride | Cl | ppm | 9.28 | Total Nitrogen | N | ppm | 2.67 |
| Boron | B | ppm | 0.01 | Phosphorus | P | ppm | 0.20 |
| Fluoride | F | ppm | 0.47 | Potassium | K | ppm | 3.00 |
| Iron | Fe | ppm | 0.01 | | | | |
| Manganese | Mn | ppm | 0.01 | | | | |
| Sulfur | S | ppm | 5.33 | | | | |

610 — pH
620 — Calcium
630 — Sodium

FIG. 6

Bedding Plants

Suggested Constant Liquid Feeding Concentration: 50-150 ppm N | Suggested Periodic Liquid Feeding Concentration: 200-350 ppm N

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Apply S.T.E.M. if growing media pH is high or micronutrient levels are lacking.

Fig. 10A

Chrysanthemum

Suggested Constant Liquid Feeding Concentration: 200-300 ppm N | Suggested Periodic Liquid Feeding Concentration: 300-400 ppm N

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Apply S.T.E.M. if growing media pH is high or micronutrient levels are lacking. Reduce fertilizer concentration after flower color is showing.

Fig. 10B

Flowering Pot Crops

Suggested Constant Liquid Feeding Concentration: 200-300 ppm N | Suggested Periodic Liquid Feeding Concentration: 300-400 ppm N

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Maintain growing media pH's above 5.8 to avoid micronutrient toxicity syndrome on iron-sensitive plants.

Fig. 10C

Foliage (General)

Suggested Constant Liquid Feeding Concentration: 150-200 ppm N | Suggested Periodic Liquid Feeding Concentration: 250-300 ppm N

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 24-8-16 Foliage Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 24-8-16 Foliage Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 24-8-16 Foliage Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Apply S.T.E.M. if growing media pH is high or micronutrient levels are lacking.

Fig. 10D

Geranium

Suggested Constant Liquid Feeding Concentration: 200-300 ppm N | Suggested Periodic Liquid Feeding Concentration: 300-400 ppm N

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 13-2-13<br>Plug & Bedding Plant Special | Peters Professional 17-3-17<br>Peat-Lite Neutral Cal-Mag | Peters Professional 15-5-25<br>Peat-Lite Flowering Crop Special<br>+<br>Peters Professional 15-0-15<br>Peat-Lite Dark Weather Feed* | Peters Professional 20-10-20<br>Peat-Lite Special<br>+<br>Peters Professional 15-0-15<br>Peat-Lite Dark Weather Feed* |
| Type 2 | Peters Excel 15-5-15<br>Cal-Mag Special | Peters Professional 17-3-17<br>Peat-Lite Neutral Cal-Mag | Peters Professional 15-5-25<br>Peat-Lite Flowering Crop Special<br>+<br>Peters Professional 15-0-15<br>Peat-Lite Dark Weather Feed* | Peters Professional 20-10-20<br>Peat-Lite Special<br>+<br>Peters Professional 15-0-15<br>Peat-Lite Dark Weather Feed* |
| Types 1 & 2 | Peters Excel 13-2-13<br>Plug & Bedding Plant Special | Peters Professional 17-3-17<br>Peat-Lite Neutral Cal-Mag | Peters Professional 15-5-25<br>Peat-Lite Flowering Crop Special<br>+<br>Peters Professional 15-0-15<br>Peat-Lite Dark Weather Feed* | Peters Professional 20-10-20<br>Peat-Lite Special<br>+<br>Peters Professional 15-0-15<br>Peat-Lite Dark Weather Feed* |
| Type 3 | Peters Professional 15-5-25<br>Peat-Lite Flowering Crop Special | Peters Professional 18-8-17<br>Peat-Lite High Mag Special | Peters Excel 21-5-20<br>Multi Purpose<br>+<br>Peters Excel 10-0-0 Magnitrate Special | Peters Professional 15-16-17<br>Peat-Lite Special<br>+<br>Peters Excel 10-0-0 Magnitrate |
| Type 4 | Peters Professional 15-5-25<br>Peat-Lite Flowering Crop Special | Peters Professional 18-8-17<br>Peat-Lite High Mag Special | Peters Excel 21-5-20<br>Multi Purpose<br>+<br>Peters Excel 10-0-0 Magnitrate Special | Peters Professional 15-16-17<br>Peat-Lite Special<br>+<br>Peters Excel 10-0-0 Magnitrate |
| Types 3 & 4 | Peters Professional 15-5-25<br>Peat-Lite Flowering Crop Special | Peters Professional 18-8-17<br>Peat-Lite High Mag Special | Peters Excel 21-5-20<br>Multi Purpose<br>+<br>Peters Excel 10-0-0 Magnitrate Special | Peters Professional 15-16-17<br>Peat-Lite Special<br>+<br>Peters Excel 10-0-0 Magnitrate |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Maintain growing media pH's above 5.8 to avoid micronutrient toxicity syndrome on iron-sensitive plants.

Fig. 10E

Hanging Baskets (General)

Suggested Constant Liquid Feeding Concentration: 200-300 ppm N | Suggested Periodic Liquid Feeding Concentration: 300-400 ppm N

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 13-2-13<br>Plug & Bedding Plant Special | Peters Professional 17-3-17<br>Peat-Lite Neutral Cal-Mag | Peters Professional 15-5-25<br>Peat-Lite Flowering Crop Special<br>+<br>Peters Professional 15-0-15<br>Peat-Lite Dark Weather Feed* | Peters Professional 20-10-20<br>Peat-Lite Special<br>+<br>Peters Professional 15-0-15<br>Peat-Lite Dark Weather Feed* |
| Type 2 | Peters Excel 15-5-15<br>Cal-Mag Special | Peters Professional 17-3-17<br>Peat-Lite Neutral Cal-Mag | Peters Professional 15-5-25<br>Peat-Lite Flowering Crop Special<br>+<br>Peters Professional 15-0-15<br>Peat-Lite Dark Weather Feed* | Peters Professional 20-10-20<br>Peat-Lite Special<br>+<br>Peters Professional 15-0-15<br>Peat-Lite Dark Weather Feed* |
| Types 1 & 2 | Peters Excel 13-2-13<br>Plug & Bedding Plant Special | Peters Professional 17-3-17<br>Peat-Lite Neutral Cal-Mag | Peters Professional 15-5-25<br>Peat-Lite Flowering Crop Special<br>+<br>Peters Professional 15-0-15<br>Peat-Lite Dark Weather Feed* | Peters Professional 20-10-20<br>Peat-Lite Special<br>+<br>Peters Professional 15-0-15<br>Peat-Lite Dark Weather Feed* |
| Type 3 | Peters Professional 15-5-25<br>Peat-Lite Flowering Crop Special | Peters Professional 18-8-17<br>Peat-Lite High Mag Special | Peters Excel 21-5-20<br>Multi Purpose<br>+<br>Peters Excel 10-0-0 Magnitrate Special | Peters Professional 20-10-20<br>Peat-Lite Special<br>+<br>Peters Excel 10-0-0 Magnitrate Special |
| Type 4 | Peters Professional 15-5-25<br>Peat-Lite Flowering Crop Special | Peters Professional 18-8-17<br>Peat-Lite High Mag Special | Peters Excel 21-5-20<br>Multi Purpose<br>+<br>Peters Excel 10-0-0 Magnitrate Special | Peters Professional 20-10-20<br>Peat-Lite Special<br>+<br>Peters Excel 10-0-0 Magnitrate Special |
| Types 3 & 4 | Peters Professional 15-5-25<br>Peat-Lite Flowering Crop Special | Peters Professional 18-8-17<br>Peat-Lite High Mag Special | Peters Excel 21-5-20<br>Multi Purpose<br>+<br>Peters Excel 10-0-0 Magnitrate Special | Peters Professional 20-10-20<br>Peat-Lite Special<br>+<br>Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Maintain growing media pH's above 5.8 to avoid micronutrient toxicity syndrome on iron-sensitive plants.

Fig. 10F

Hydroponics (General)

| Suggested Constant Liquid Feeding Concentration: 150-300 ppm N | | Suggested Periodic Liquid Feeding Concentration: N/A | | |
|---|---|---|---|---|
| Water Type(s) | [A] or [B] Stand Alone Products | | [B]+[C] Combination or Rotation Products | |
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 5-11-26 Hydroponic Special + Peters Professional 15-0-15 Peat-Lite Dark Weather Feed* | Peters Professional 5-11-26 Hydroponic Special + Calcium Nitrate + Potassium Nitrate + Peters Excel 10-0-0* |
| Type 2 | Peters Excel 15-5-15 Cal-Mag Special | Peters Professional 17-3-17 Peat-Lite Neutral Cal-Mag | Peters Professional 5-11-26 Hydroponic Special + Peters Professional 15-0-15 Peat-Lite Dark Weather Feed* | Peters Professional 5-11-26 Hydroponic Special + Calcium Nitrate + Potassium Nitrate + Peters Excel 10-0-0* |
| Types 1 & 2 | Peters Excel 13-2-13 Plug & Bedding Plant Special | Peters Professional 17-3-17 Peat-Lite Neutral Cal-Mag | Peters Professional 5-11-26 Hydroponic Special + Peters Professional 15-0-15 Peat-Lite Dark Weather Feed* | Peters Professional 5-11-26 Hydroponic Special + Calcium Nitrate + Potassium Nitrate + Peters Excel 10-0-0* |
| Type 3 | Peters Professional 15-3-25 Peat-Lite Flowering Crop Special Plus Iron | Peters Professional 18-8-17 Peat-Lite High Mag Special | Peters Professional 5-11-26 Hydroponic Special + Peters Professional 15-0-15 Peat-Lite Dark Weather Feed* | Peters Professional 5-11-26 Hydroponic Special + Potassium Nitrate + Peters Excel 10-0-0 |
| Type 4 | Peters Professional 15-3-25 Peat-Lite Flowering Crop Special Plus Iron | Peters Professional 18-8-17 Peat-Lite High Mag Special | Peters Professional 5-11-26 Hydroponic Special + Peters Professional 15-0-15 Peat-Lite Dark Weather Feed* | Peters Professional 5-11-26 Hydroponic Special + Potassium Nitrate + Peters Excel 10-0-0 |
| Types 3 & 4 | Peters Professional 15-3-25 Peat-Lite Flowering Crop Special Plus Iron | Peters Professional 18-8-17 Peat-Lite High Mag Special | Peters Professional 5-11-26 Hydroponic Special + Peters Professional 15-0-15 Peat-Lite Dark Weather Feed* | Peters Professional 5-11-26 Hydroponic Special + Potassium Nitrate + Peters Excel 10-0-0 |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Monitor pH and soluble salt levels frequently to make sure fertility levels are adequate. Concentrations and nutrient levels will depend on specific crops and timing during the production cycle.

Fig. 10G

Pansy, Vinca & Salvia

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 15-2-20 Pansy, Salvia & Vinca | Peters Professional 17-3-17 Peat-Lite Neutral Cal-Mag | Peters Professional 15-3-25 Peat-Lite Flowering Crop Special Plus Iron + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 2 | Peters Excel 15-2-20 Pansy, Salvia & Vinca | Peters Professional 17-3-17 Peat-Lite Neutral Cal-Mag | Peters Professional 15-3-25 Peat-Lite Flowering Crop Special Plus Iron + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Types 1 & 2 | Peters Excel 15-2-20 Pansy, Salvia & Vinca | Peters Professional 17-3-17 Peat-Lite Neutral Cal-Mag | Peters Professional 15-3-25 Peat-Lite Flowering Crop Special Plus Iron + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 3 | Peters Professional 15-3-25 Peat-Lite Flowering Crop Special Plus Iron | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Type 4 | Peters Professional 15-3-25 Peat-Lite Flowering Crop Special Plus Iron | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Types 3 & 4 | Peters Professional 15-3-25 Peat-Lite Flowering Crop Special Plus Iron | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

Suggested Constant Liquid Feeding Concentration: 100-150 ppm N | Suggested Periodic Liquid Feeding Concentration: 225-275 ppm N

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Apply S.T.E.M. if growing media pH is high or micronutrient levels are lacking. Occasional Boron supplements may help.

Fig. 10H

Plugs / Liners

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

Suggested Constant Liquid Feeding Concentration: 50-150 ppm N | Suggested Periodic Liquid Feeding Concentration: 150-250 ppm N

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate.

Fig. 10I

Perennials (General)

| | Suggested Constant Liquid Feeding Concentration: 150-200 ppm N | | Suggested Periodic Liquid Feeding Concentration: 250-300 ppm N | |
|---|---|---|---|---|
| Water Type(s) | [A] or [B] Stand Alone Products | | [B]+[C] Combination or Rotation Products | |
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 3 | Peters Professional 15-5-25 Peat-Lite Flowering Crop Special | Peters Professional 18-3-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Type 4 | Peters Professional 15-5-25 Peat-Lite Flowering Crop Special | Peters Professional 18-3-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Types 3 & 4 | Peters Professional 15-5-25 Peat-Lite Flowering Crop Special | Peters Professional 18-3-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Apply S.T.E.M. if growing media pH is high or micronutrient levels are lacking.

Fig. 10J

Poinsettia

| | Suggested Constant Liquid Feeding Concentration: 200-300 ppm N | | Suggested Periodic Liquid Feeding Concentration: 300-400 ppm N | |
|---|---|---|---|---|
| Water Type(s) | [A] or [B] Stand Alone Products | | [B]+[C] Combination or Rotation Products | |
| | Option I | Option II | Option I | Option II |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Consider lower concentrations for dark leaf cultivars. Apply a 1 to 2 oz/100 gal supplement of S.T.E.M. on Oct. 1 and Nov. 1 to maintain good foliage color. Spoon feed with Ammonium molybdate in October and November. Calcium sprays may be beneficial during leaf and bract development. Reduce fertilizer to 50 to 75 ppm N during the last two weeks of production.

Fig. 10K

Trees & Shrubs (General)

| Water Type(s) | [A] or [B] Stand Alone Products | | [B]+[C] Combination or Rotation Products | |
|---|---|---|---|---|
| | Option I | Option II | Option I | Option II |
| | Suggested Constant Liquid Feeding Concentration: 50-100 ppm N | Suggested Periodic Liquid Feeding Concentration: 200-350 ppm N | | |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

\* These products cannot be tank mixed in a concentration; use in a rotation or use a multiple-headed injector.

BEST MANAGEMENT PRACTICES: Monitor soluble salt levels frequently to make sure fertility levels are adequate. Consider supplementing with controlled release fertilizers for heavy feeders. Apply S.T.E.M. if growing media pH is high or micronutrient levels are lacking.

Fig. 10L

Vegetable Transplants (General)

| Water Type(s) | [A] or [B] Stand Alone Products | | [B]+[C] Combination or Rotation Products | |
|---|---|---|---|---|
| | Option I | Option II | Option I | Option II |
| | Suggested Constant Liquid Feeding Concentration: 50-100 ppm N | Suggested Periodic Liquid Feeding Concentration: 200-350 ppm N | | |
| Type 1 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Types 1 & 2 | Peters Excel 13-2-13 Plug & Bedding Plant Special | Peters Professional 17-3-17 Peat-Lite Neutral Cal-Mag | Peters Professional 15-5-25 Peat-Lite Flowering Crop Special + Peters Professional 15-0-15 Peat-Lite Dark Weather Feed* | Peters Professional 20-2-20 Peat-Lite Low Phos Special + Peters Professional 15-0-15 Peat-Lite Dark Weather Feed* |
| Type 3 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Type 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Types 3 & 4 | Peters Professional 15-5-25 Peat-Lite Flowering Crop Special | Peters Professional 18-8-17 Peat-Lite High Mag Special | Peters Excel 21-5-20 Multi Purpose + Peters Excel 10-0-0 Magnitrate Special | Peters Professional 20-2-20 Peat-Lite Low Phos Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

\* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Apply S.T.E.M. if growing media pH is high or micronutrient levels are lacking.

Fig. 10M

Vegetative Spring Crops (Heavy Feeders)

Suggested Constant Liquid Feeding Concentration: 250-400 ppm N | Suggested Periodic Liquid Feeding Concentration: 350-500 ppm N

| Water Type(s) | [A] or [B] Stand Alone Products | | [B]+[C] Combination or Rotation Products | |
|---|---|---|---|---|
| | Option I | Option II | Option I | Option II |
| Type 1 | Peters Excel 15-2-20 Pansy, Salvia & Vinca | Peters Professional 17-3-17 Peat-Lite Neutral Cal-Mag | Peters Professional 15-3-25 Peat-Lite Flowering Crop Special Plus Iron + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 2 | Peters Excel 15-5-15 Cal-Mag Special | Peters Professional 17-3-17 Peat-Lite Neutral Cal-Mag | Peters Professional 15-3-25 Peat-Lite Flowering Crop Special Plus Iron + Peters Professional 15-0-15 Peat-Lite Dark Weather Feed* | Peters Professional 20-10-20 Peat-Lite Special + Peters Professional 15-0-15 Peat-Lite Dark Weather Feed* |
| Types 1 & 2 | Peters Excel 15-2-20 Pansy, Salvia & Vinca | Peters Professional 17-3-17 Peat-Lite Neutral Cal-Mag | Peters Professional 15-3-25 Peat-Lite Flowering Crop Special Plus Iron + Peters Professional 15-0-15 Peat-Lite Dark Weather Feed* | Peters Professional 20-10-20 Peat-Lite Special + Peters Professional 15-0-15 Peat-Lite Dark Weather Feed* |
| Type 3 | Peters Professional 15-3-25 Peat-Lite Flowering Crop Special Plus Iron | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Type 4 | Peters Professional 15-3-25 Peat-Lite Flowering Crop Special Plus Iron | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Types 3 & 4 | Peters Professional 15-3-25 Peat-Lite Flowering Crop Special Plus Iron | Peters Professional 18-8-17 Peat-Lite High Mag Special | Peters Excel 21-5-20 Multi Purpose + Peters Excel 10-0-0 Magnitrate Special | Peters Professional 20-10-20 Peat-Lite Special + Peters Excel 10-0-0 Magnitrate Special |
| Variable Types/Unknown | TEST YOUR WATER FIRST, THEN SELECT THE BEST FERTILIZER SUITED FOR YOUR SPECIFIC WATER QUALITY TYPE. | | | |

* These products cannot be tank mixed in a concentration; use in a rotation or use a multiple-headed injector.

BEST MANAGEMENT PRACTICES: Lower phosphorus inputs can help keep plants compact. Monitor soluble salt levels frequently to make sure fertility levels are adequate. Consider supplementing with controlled release fertilizers for heavy feeders. Maintain growing media pH's below 6.0 to avoid micronutrient deficiency symptoms. Apply S.T.E.M. if growing media pH is high or micronutrient levels are lacking.

Fig. 10N

SYSTEM AND METHOD FOR FERTILIZER SELECTION

CROSS REFERENCE TO RELATED APPLICATIONS

This application claims the benefit under 35 U.S.C. 119(e) of U.S. Provisional Application No. 60/879,029 filed on Jan. 5, 2007, which is incorporated herein by reference in its entirety for all purposes.

FIELD OF THE INVENTION

The invention relates generally to systems and methods for selecting fertilizer, and more particularly to systems and methods for facilitating the selection of a water soluble fertilizer based on a combination of water chemistry and crop type.

BACKGROUND OF THE INVENTION

There is considerable variety among fertilizer products, in terms of their relative percentages of nitrogen (N), phosphorous (P), and potassium (K), the primary nutrients for plants. The percentages are expressed as a ratio and are prominently displayed as three numbers on the packaging of most brands. The numbers 5-10-5, mean that 5% of the product is nitrogen (N), 10% is available phosphate ($P_2O_5$), and 5% is soluble potash ($K_2O$). The nitrogen may be further categorized as nitrates, ammoniacal and/or urea. The NPK ratio of a particular product is one way to judge whether it is a suitable fertilizer for a plant. General purpose fertilizers are typically balanced. They contain all three major nutrients—NPK—which are present in the proportions likely to be needed in a healthy soil. These general purpose fertilizers are suitable for use in plants where there are no special problems with the soil. They are most commonly and easily used in a granular form that can be spread uniformly with a mechanical spreader and watered in by rain or an irrigation system. In a greenhouse environment, liquid fertilizers, solid fertilizers diluted with water or solid fertilizers incorporated into the plant container itself are generally the preferred fertilizer application types.

Special purpose fertilizers are typically "unbalanced", featuring a greater proportion of one or the other major nutrients, secondary nutrients such as calcium or magnesium, special micronutrients, or combinations there of, that may suit them for particular situations or plants. These products are marketed for specific uses. However, the marketing descriptions and materials may not always be horticulturally sound. For instance, there are fertilizers labeled for acid-loving plants such as azaleas and holly that help provide iron in a form that these plants can use. There are bulb fertilizers that provide generous amounts of phosphorus that bulbs require. Some are labeled specifically for lawns, tomatoes or trees. As a grower learns more about the plants and soil these special purpose products may be useful in maximizing his crop. However, a general purpose fertilizer is adequate in most situations.

Water soluble fertilizers are one genre of fertilizer products. Generally, water soluble fertilizers are fairly simple to make. The basic concept is to mix high quality raw materials in specific ratios that are advantageous to growing high quality plant material. Water soluble fertilizers are commonly used by non-agricultural professional growers (i.e. those that grow in artificial substrates and greenhouse mediums for sale to retailers) who rely primarily on nutrients from the water as opposed to the soil. These products are designed to be mixed with water in concentrated form, then diluted with injector systems that proportion the fertilizer solution to obtain the proper concentration. Therefore, in these circumstances, the selection of the proper fertilizer in terms of its relative percentages of nitrogen (N), phosphorous (P), potassium (K), calcium (Ca) and magnesium (Mg) is based on the water chemistry and in particular the water's alkalinity, calcium and magnesium levels. These types of fertilizers are used when a grower relies on nutrients from the water as well as the soil and therefore, uses information concerning water chemistry in conjunction with the selection of a fertilizer. Following traditional methods, a grower tests the water at his facility and then based on those test results, gets a fertilizer recommendation and application schedule based on the results of the water quality test and the specific crop being grown from a trained horticulturalist.

Because of the burden of the need to test the water and then consult a trained horticulturalist for recommendations, growers often choose to simply make a best guess on the selection of the proper fertilizer in terms of its relative percentages of nitrogen (N), phosphorous (P), and potassium (K) or the product name or how the product is marketed (e.g. the suggestion of how the product should be used). As a result, the present invention provides a novel system and method that facilitates appropriate fertilizer selection in an easy-to-use product selection system. Furthermore, this novel system and method helps to insure consistency in fertilizer recommendations.

SUMMARY OF THE INVENTION

An embodiment of the present invention discloses a method selecting a fertilizer including the steps of determining water type, and selecting a fertilizer classification based on the water type. Another embodiment discloses a method, for selecting a fertilizer further including identifying a crop type and selecting a fertilizer based upon the water type and crop type.

BRIEF DESCRIPTION OF THE DRAWINGS

FIG. 1 is a table categorizing exemplary water types by chemistry.

FIG. 3 is a table categorizing exemplary fertilizer types by chemical make up.

FIGS. 4A and 4B depicting exemplary packaging for a fertilizer product.

FIG. 6 is an exemplary water test result summary sheet.

FIGS. 10(A-N) are a collection of illustrative tables depicting exemplary fertilizer recommendations.

DETAILED DESCRIPTION OF PREFERRED EMBODIMENTS OF THE INVENTION

Figure 2:
FIG. 2 is a map of the United States illustrating typical water chemistry by geographic location.

Various embodiments of the invention are described hereinafter with reference to the figures. It should also be noted that the figures are only intended to facilitate the description of specific embodiments of the invention. The embodiments are not intended as an exhaustive description of the invention or as a limitation on the scope of the invention. In addition, an aspect described in conjunction with a particular embodiment of the invention is not necessarily limited to that embodiment and can be practiced in any other embodiment of the invention.

The present invention discloses a system for selecting water soluble fertilizers. As will be appreciated by one of skill in the art, the system and method disclosed is equally applicable to a selection of a fertilizer based on soil type.

Based upon years of horticultural experience and lab data manufacturers may have the ability to develop a nutrition program based on crop types that will work in a wide variety of growing situations. The present invention provides a novel system and method that allows a distributor to sell and a grower to buy the proper product for a given crop based on the crop and water type without necessitating a personal consultation with a trained horticulturist or other technically trained person. Furthermore the present system and method allows for consistent fertilizer selection by making general assumptions about water and plant conditions.

In order to determine the best suited fertilizer, it is necessary to determine the water chemistry. A professional grower will usually do this by having the water tested. Typically irrigation water is tested for alkalinity and particular nutritional and chemical contents. Once tested the water may be grouped into particular classifications or types. Referring to FIG. 1, the table 100 illustrates an exemplary categorization of water type. For example, the water type could be categorized by determining the alkalinity, calcium (Ca) and magnesium (Mg) levels. In this example, the water is categorized into four types: Type 1 "Pure Water" which generally means low levels of nutrients and buffering capacity, low salinity, 110 that has alkalinity less than 60 ppm, 0-60 ppm of Ca and less than 50 ppm of Mg; Type 2 "Moderately Pure Water", generally water that has only slight buffering, 120 that has alkalinity between 60 to 150 ppm, 0-60 ppm of Ca, and less than 50 ppm of Mg; Type 3 water 130 has alkalinity between 150 and 200, greater than 30 ppm of Ca and less than 50 ppm of Mg, and Type 4 water 140 that has alkalinity of 200 to 240+ ppm, greater than 30 ppm of Ca and less than 50 ppm of Mg. In a preferred embodiment, Type 1 water has alkalinity less than 60 ppm, 0-30 ppm of Ca and less than 30 ppm of Mg; Type 2 water has alkalinity between 60 to 150 ppm, 0-50 ppm of Ca, and less than 30 ppm of Mg; Type 3 water has alkalinity between 150 and 200, greater than 50 ppm of Ca and less than 30 ppm of Mg, and Type 4 water has alkalinity between 200-240 ppm, greater than 50 ppm of Ca and less than 30 ppm of Mg. While four water types are described in the present embodiment, this is not intended to be a limitation on the number of water types that may be utilized, one of skill in the art will appreciate that the number could be less or greater than that given in the present embodiment. The water types could similarly be classified based on different criteria, i.e. different minerals, or chemical compositions.

Alternatively, a grower may not test the irrigation water but may instead assume that the irrigation water has particular characteristics based on the water source or past experience. Such characteristics could be ascertained by contacting the local water agency or by obtaining historical information. Historical information could be made available on a map, or through data tables, a database or any other means by which the information may be conveyed. FIG. 2 is an exemplar of a map 200 depicting various categorizations of water types. As shown, each particular water type is represented by a different shading 202(a-g).

Turning now to FIG. 3, FIG. 3 is a chart 300 depicting exemplary classifications of fertilizers. Generally, fertilizers types are grouped by application type such as "stand alone" products 310, base products 320, specialty products 330 and customizing components 340. Stand alone fertilizers provide adequate levels of primary (NPK) and secondary nutrients (Ca, Mg, S) in a single product. For example, a stand alone product could be a products that contain between 1 to 7% calcium and 1 to 5% magnesium for type 1 and type 2 water or products that contain between 1 to 5% magnesium for Type 3 and Type 4 water. Stand alone fertilizer products 310 are ones that provide all the required plant nutrients in a single product, that is, no additional nutrients are required. Base products generally do not supply a complete nutrient balance and need to be combined with or rotated with customizing components to do so. Specialty products are a subcategory of base products that are specially customized for unique soil, water, or crop conditions. Base products 320 and specialty products 330 are fertilizers that complement either stand alone products 310 or customizing components 340. Base products 320 and specialty products 330 provide added nutrients based on plant type, soil conditions, or water type. For example, a specialty product may be used if the soil pH (a measure of the acidity of a soil solution in terms of activity of hydrogen) is high, the phosphorous level in the soil is low, or the boron level in the water is high. Finally, customizing components 340 are nutrients that are added to stand alone 310 or base products 320 to create custom mixtures for specific applications. These special customizing components are used to improve the nutritional program in specific water quality or used on special crop needs. For example, a single component product containing Mg alone may be added to supplement magnesium levels, similarly a dual component product containing Ca and Mg could be added to supplement both calcium and magnesium. Customizing components are often added to suit the special needs of a plant's particular growth phase. The chemical formulations in the chart 300 of FIG. 3 (those numbers shown in the N, P, K identifiers) are intended to be exemplary only and do not limit the scope of the present invention to the specific formulations provided.

Figure 4A:
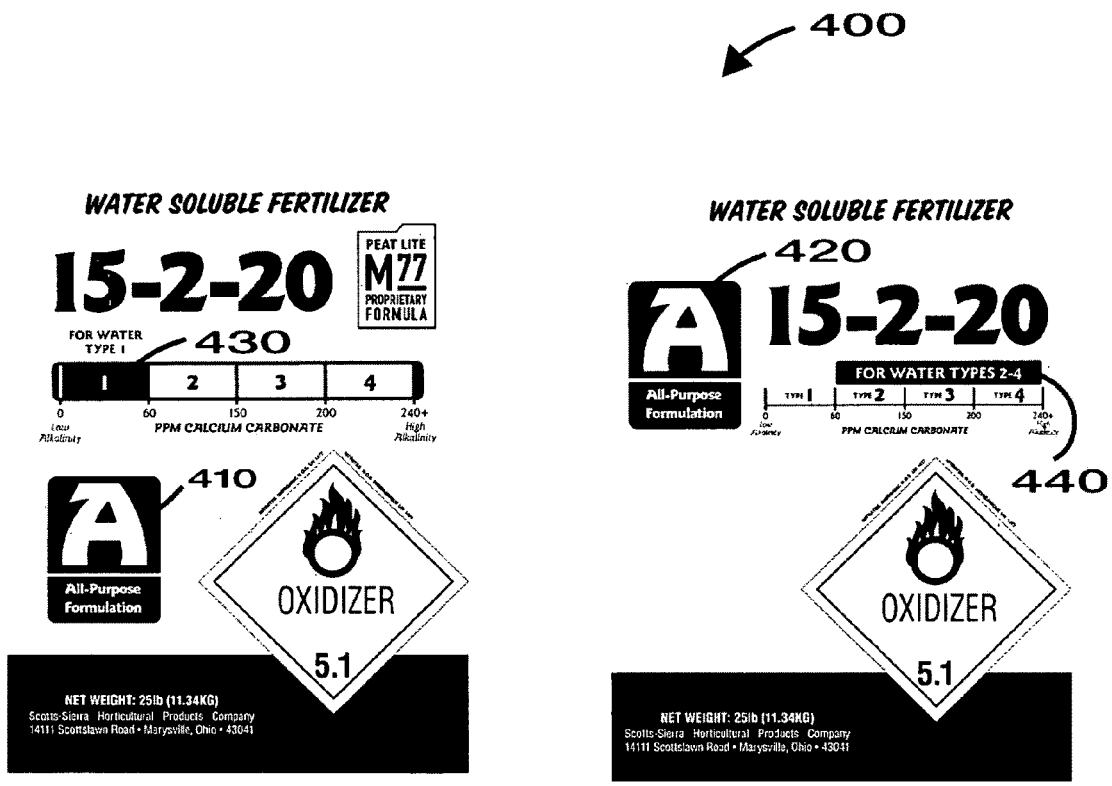

In order to simplify identification of the type of a fertilizer, the fertilizer packaging could be clearly labeled with an identifier that would correspond to a particular type of product. FIGS. 4A and 4B show such packaging. Fertilizer formulas may be categorized into types. For example, fertilizers could be categorized into three types for example, as described above in conjunction with FIG. 3: an "A" fertilizer—or a formula that could be used as a "stand alone" nutrition option 310; a "B" fertilizer—a "base product" 320 or "specialty component" 330, these products would be used as the foundation of the fertilizer nutrition program but could be supplemented with a "C" fertilizer—a "customizing formulation" 340. The fertilizer packaging 400 would therefore be labeled with the appropriate letter 410, 420 defining the type. While the fertilizer types are described in terms of three groups in the present embodiment, this is not intended to be a limitation on the number of groups by which fertilizer types may be categorized, one of skill in the art will appreciate that the number could be less or greater than that given in the present embodiment.

In addition, the packaging could be labeled with water types. The package could indicate the fertilizer it is suitable for use with a single water type 430 or multiple water types 440. The labeling on the fertilizer package would designate that a particular fertilizer would be paired with a specific water type, as identified in conjunction with FIG. 1. Therefore, a fertilizer package label would have both a letter and number assignment indicating the fertilizer type and the water type most suited to that particular fertilizer blend. The packaging may also have instructions indicating the proper selection procedure which could include testing, and therefore determining the water chemistry and identifying the type of crop 450.

In application, the system and method of the present invention is designed to enable a grower to select a fertilizer product best suited to the water and plant type that is employed without requiring the grower to spend the time to obtain an individual evaluation. A grower could select a product in a variety of different ways by implementing the present invention.

Figure 5:
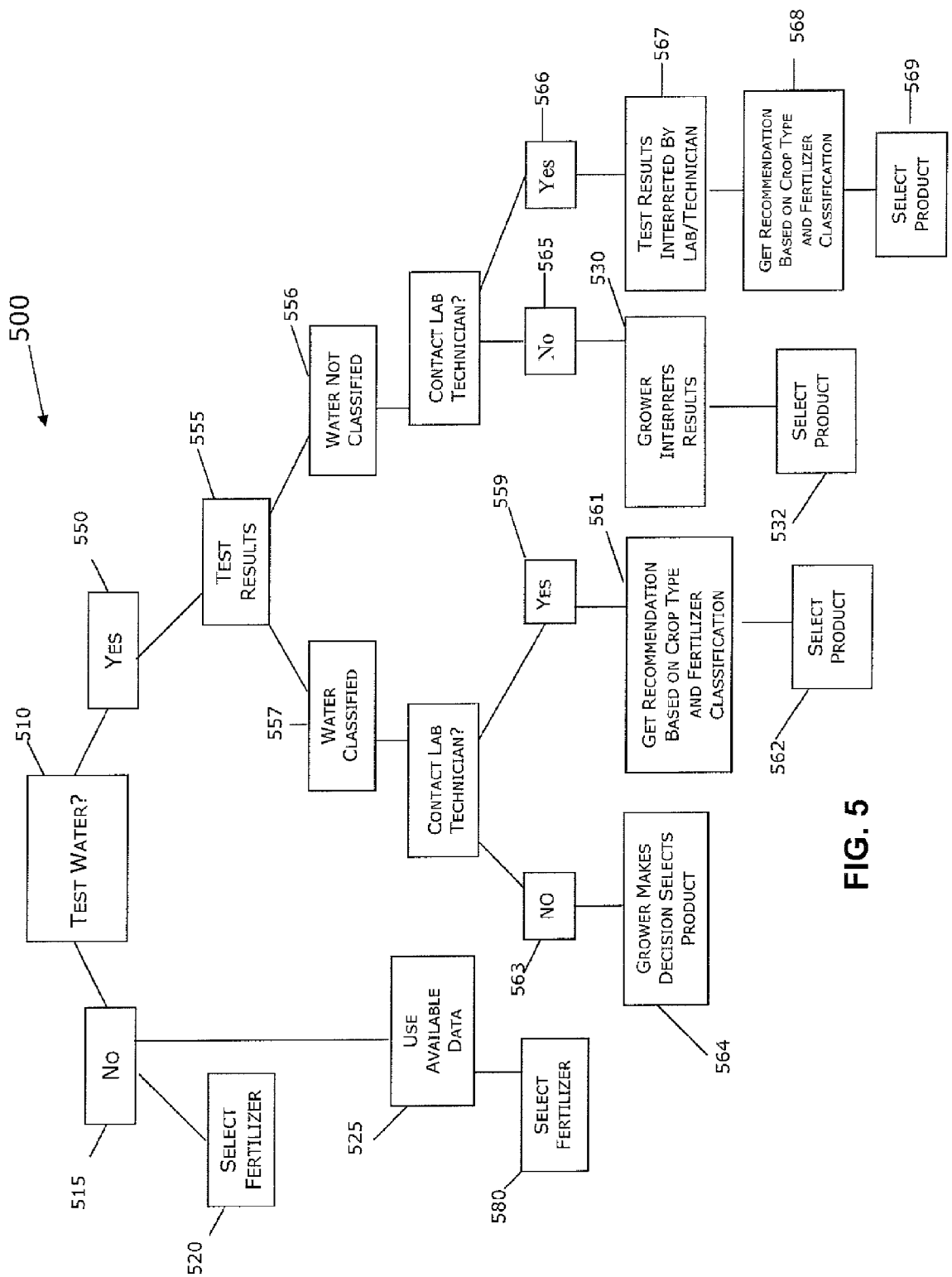
FIG. 5 is flow chart illustrating a method for selecting fertilizer.

FIG. 5 is a flow chart 500 illustrating a method for selecting fertilizer. The grower begins by making a decision regarding the testing of his irrigation water 510. If the grower tests the water 550 the grower then gets test results back 555. Once the grower receives the test results 555, if there no classification determination was made 556 the grower may contact the testing laboratory or a fertilizer technician or any other qualified third party to obtain an interpretation of the test results 567. The interpretation of the lab results would include indicating the type of water the grower is using by placing it into a type category such as that described in conjunction with FIG. 1. Then, given the water type, the crop to be grown and the grower's preference of fertilizer classification 568, such as that described in conjunction with FIG. 3, the lab or technician would recommend a fertilizer 569. Alternatively the grower could not decide not contact the laboratory or a technician 565 and instead interpret the results himself 530 and select a product 532.

Alternatively, the laboratory test results could have the water type, as determined by a classification such as that shown in conjunction with FIG. 1, 557 printed on the lab results sheet itself. If the grower contacts the lab or gets an interpretation from a technician 559, the grower will also receive a fertilizer recommendation based on the water test results, the plants that are being grown and the grower's fertilizer classification preference 561 and from that select a product 562. On the other hand, if the grower chooses not to call the laboratory or a technician 563 and the water type is not indicated on the test results, a grower may turn to a water classification table, such as that illustrated in FIG. 1 and from the table and the laboratory results, determine the water type and select a product 564.

FIG. 6 depicts a sample water test report 600, such as that referenced in FIG. 5, when the grower receives the test results 555. By referencing the alkalinity 610, calcium 620 and magnesium 630 test results the grower is able to classify the water type. Based on the water chemistry in the same test report 600—alkalinity of less than 60 ppm, calcium between 0-60 ppm and magnesium of less than 50 ppm, the grower would conclude he has Type 1 water, assuming the classification schedule in FIG. 1.

Once the grower determines the water type from the test results, the grower identifies the type of plant he will be propagating. Then, based on the water and plant types, the grower could select a fertilizer. The fertilizer selected could also be influenced by the type of fertilizer the grower wishes to use. For convenience he may select an appropriate fertilizer from the stand alone group—Type A, or some other combination, e.g. a Type B complemented with a Type C.

Turning back to FIG. 5, alternatively, a grower may choose to not test the water 515. In this instance, the grower may make a fertilizer selection based on past growing experience, crop, product type and convenience 520, however it is unlikely the optimal fertilizer product would be selected. Preferably, even if a grower decides not to test the water, he may refer to a map 525 such as that shown in FIG. 2 or other available water data in order to determine the likely water type. Then based on the water type, crop and preference of fertilizer type, the grower can select an appropriate fertilizer 580.

Figure 7:
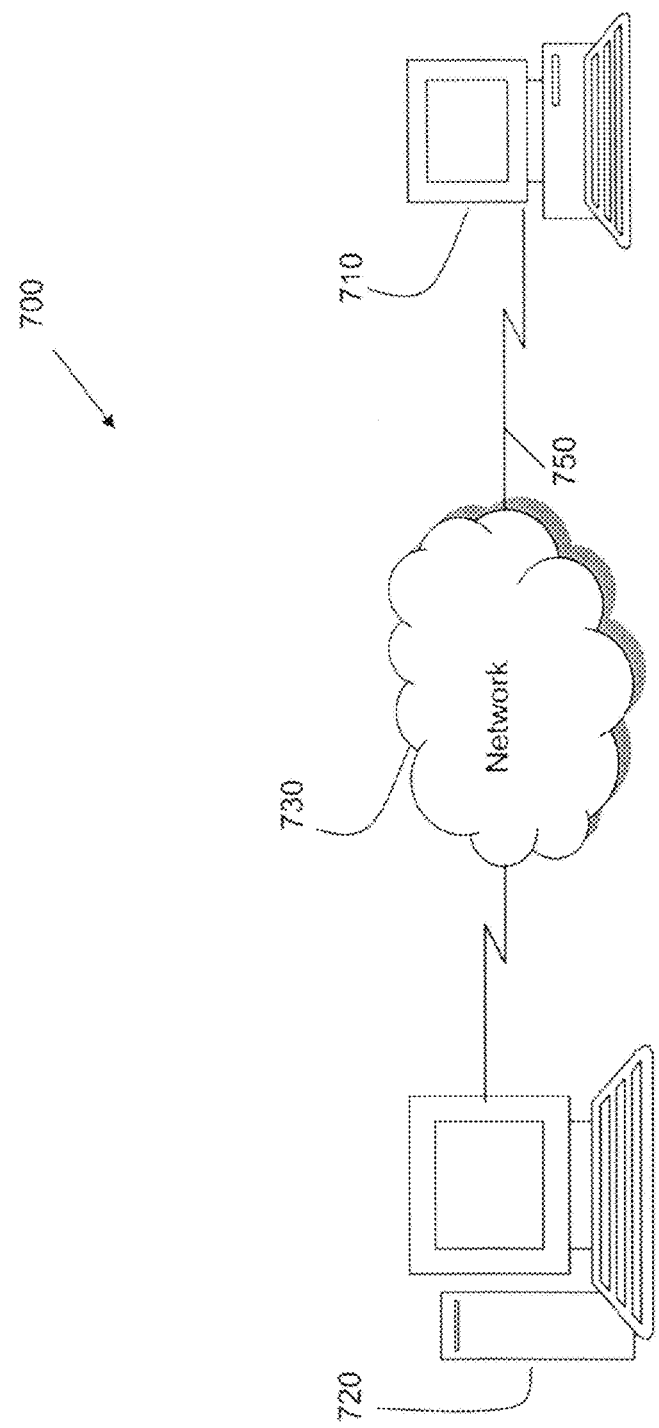
FIG. 7 is a block diagram illustrating a computer system in accordance with an embodiment of the present invention.

While a manual process is described, such a selection process is equally applicable to an automated system. FIG. 7 is an exemplary depiction of one such system 700. FIG. 7 is a block diagram of a system 700 for selection of a fertilizer product via a network 730 from a remote device 720 and delivering the results to a client computer 710. The systems comprises a remote server 720 linked to a network 730. The network may be any network such as a Local Area Network (LAN), Wide Area Network (WAN), an Extranet or an Internet. However, in a preferred embodiment the network 730 is the Internet. Although only one remote server is depicted, one skilled in the art will recognize that any number of remote servers may be utilized.

The network 730 is coupled to a client computer 710 through a communication link 750, such as a wireless connection, phone line, cable line, digital subscriber line, infrared link or the like. The client computer 710 includes any computing device that can couple to the network 730 via the communication line 750. The client computer 710 may be a personal computer, laptop computer, handheld, computer, mainframe computer, PDA, smartphone or the like.

Figure 8:
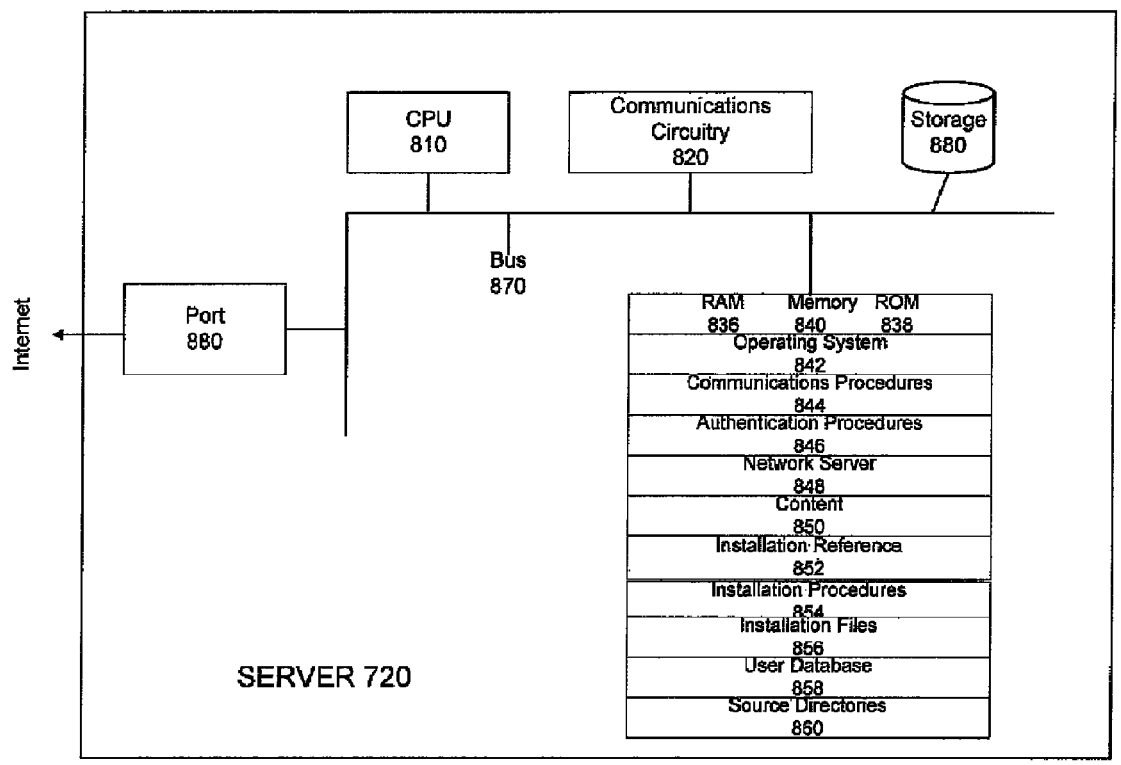
FIG. 8 is a block diagram of the remote server shown in FIG. 7.

FIG. 8 is a block diagram of the remote server 720 shown in FIG. 7. In an embodiment of the invention, execution of the sequence of instruction required to practice the invention is performed by the remote sever 720. According to other embodiments of the invention (not shown) two or more remote severs coupled by a communication link may perform the sequence of instruction required to practice the invention in coordination with one another. In order to avoid needlessly obscuring the invention, a description of only one computer system 120 is presented herein, however it should be understood that any number of computer systems may be employed to practice the invention. As used herein the term remote server is broadly used to describe any computing device that can store and independently run one or more programs.

The remote server 720 contains a plurality of components such as at least one central processing unit (CPU) 810, communications circuitry 820, at least one communication port 830, a memory 840 and at least one bus 870 that connects the aforementioned components. The communications circuitry 820 and the communications port 830 preferably include one or more Network Interface Cards (NICs) configured to communicate with the network 730 and the client computer 750. The memory 840 preferably comprises Random Access Memory (RAM) 838 or other dynamic storage device for storing dynamic data and instruction to be executed by the processing unit 810 and/or Read Only Memory (ROM) 836 or other static storage coupled to the bus 870 for storing static data and instruction for the processing unit 810. A storage device 880 such as a magnetic disk or other optical disk may also be provided and coupled to the bus 870 for storing data and instruction for the processing unit 810. The memory 840 preferably includes an operating system 842 which has instructions for communicating, processing, accessing, storing, or searching data. Examples of suitable operating systems include MICROSOFT WINDOWS™, DOS™, UNIX™, LINUX™ and MAC OS™. The main memory 840 may also be used for storing temporary data or other immediate information during the execution of instruction by the processing unit 810. In addition, memory 840 preferably includes communication procedures 844, authentication procedures 846, a network server 848, content 850, an installation reference 852, installation procedures 854, installation files 856, a user database 858, one or more source directories 860 containing software and/or other data.

The communications procedures 844 are used for communicating with both the client computer 750 and the network 730. The authentication procedures 854, are used for authenticating users, such as through a username and password system. Successful completion of the authentication procedures gives users access to the installation files 856 on the server 720.

The network server 848 receives and delivers data between itself and the client computer 710. The network server 848 also executes server-side scripts (CGI scripts, JSPs, ASPs, etc.) that provide functions such as database searching. The content 850 is any information that is available for retrieval by the user, including Web-pages, images, music, audio, white papers, drivers, as well as training, educational and reference materials. The content 850 is not presented in a programming language but rather in a "presentation language." Examples of presentation languages include but are not limited to HTML, XML, XHTML and CGI.

The installation procedures 854 may be used to install fertilizer selection software, data or other information onto the client computer 710.

According to one embodiment of the invention an individual server performs specific operations by its processing unit executing one or more instructions contained in the main memory. In alternative embodiments, hard-wired circuitry may be used in place of or in combination with software instructions to implement the invention. Thus, the embodiments of the invention are not limited to any specific combination of hardware circuitry and/or software.

The term "computer-usable medium," as used herein, refers to any medium that provides information or is usable by the processor(s) 210. Such a medium may take many forms, including, but not limited to, non-volatile, volatile and transmission media. Non-volatile media, i.e., media that can retain information in the absence of power, includes the ROM, CD ROM, magnetic tape, and magnetic discs. Volatile media, i.e., media that cannot retain information in the absence of power, includes the main memory 240. Transmission media includes coaxial cables, copper wire and fiber optics, including the wires that comprise the bus 270. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Figure 9:
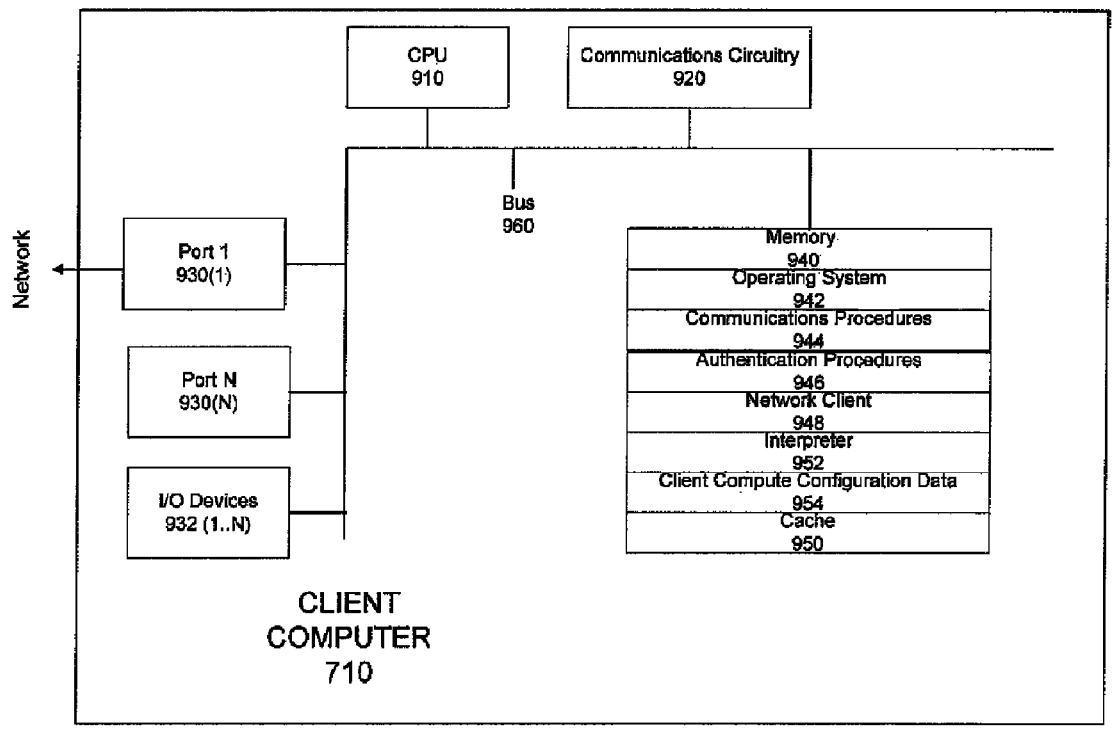
FIG. 9 is a block diagram of the client computer shown in FIG. 7.

FIG. 9 is a block diagram of client computer 710. Client computer 710 comprises a plurality of components, such as a central processing unit (CPU) 910; communications circuitry 920; ports 930(1)-(N), where port 1 is connected to network 750; input/output devices 932 (1)-(N), such as a monitor and keyboard; a memory 940; and at least one bus 960 that connects the aforementioned components.

The memory 940 preferably includes an operating system 942, such as MICROSOFT WINDOWS™, DOS™, UNIX™, LINUX™ and MAC OS™, which has instructions for communicating, processing, accessing, storing, and searching data. The memory 942 further preferably includes: communications procedures 944, authentication procedures 946, a network client 948, and a cache 950 for temporarily storing data. In use, the cache may contain an interpreter 952, and client computer configuration data 954.

Communications procedures 944 are used for communicating with the network 730 Authentication procedures 946 are used to authenticate a client computer's access to the remote server 720.

The network client 948 receives the content 850 (FIG. 2) from the remote server 720. The network client 948 may be a browser or similar type program, such as MICROSOFT'S INTERNET EXPLORER™ or NETSCAPE'S NAVIGATOR™

Interpreter 952 is a high-level programming language translator that translates a program statement into machine language, executes it, and then proceeds to the next statement. In one embodiment, interpreter 952 creates parameter tags to the applet tag in content 850.

Installation procedures 854 are used to download and install fertilizer selection software onto the client computer 710. The client computer configuration data 954 contains the client computer's configuration information, such as the hardware and software that makes up the client computer 710 (FIG. 1).

There are numerous possible embodiments for the implementation of a fertilizer selection method. A grower may select a fertilizer by utilizing an automated system such as a web based program that is accessible through a network or downloading software from a remote server to a client computer or installing software from a disc, CD, DVD, or other storage media, or by reviewing information available in hardcopy format. For example, a grower could access a web based program which would guide the grower through each of the steps described above in conjunction with FIG. 5. The results could be automated such that a fertilizer recommendation is made after the grower has gone through each step and responded to a series of questions, i.e. water type, crop type, fertilizer type, or alternatively, the grower could select a fertilizer product from a listing that is provided after the series of questions are answered.

Turning, now to FIGS. 10(A-N), shown are exemplary fertilizer recommendations and application rates based upon an analysis of water type, crop selection and fertilizer type preference. While many illustrative crop types are shown in FIGS. 10(A-N) for ease of understanding a detailed description is provided herein for FIG. 10A only. Although a single description is provided, this is not intended to be a limitation on the crop type, fertilizer classification, water type combination that is included within the scope of the present invention. One of skill in the art will appreciate that there are numerous possible combinations. In determining the recommended fertilizer, first the crop a grower is cultivating may be identified, 1010A. Once the crop is identified, then the grower decides the classification of fertilizer product that is preferred 1020A, i.e. stand alone, base, specialty, customizing. Finally, given the chemistry of the water the grower is using, the grower can classify his water into a designated category 1030A, i.e. Type 1, Type 2, Type 3, Type 4. Given knowledge of each of the described factors, a fertilizer recommendation is obtained such as those exemplary recommendations shown in the grid 1040A. In some instances, fertilizer concentration (for example parts per million) and application methods (for example spoon feed) and frequency rates (for example quarterly) may also be provided.

The above described method also improves a distributor's ability to stock appropriate products based on water type in the geographic region. Furthermore, distributors would also be able to make better educated recommendations based on water type, crop selection and fertilizer classification.

In the foregoing specification, the invention has been described with reference to exemplary embodiments thereof.

It will, however, be evident that various additions, deletions, modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions or a different combination or ordering of process actions. The specification and drawings are, accordingly, to be regarded in an illustrative rather than restrictive sense.

The invention claimed is:

1. A method of selecting a fertilizer type comprising:
    entering geographic location data into a computer to determine a water type;
    determining at least one fertilizer type that is compatible with said computed water type; and
    communicating said fertilizer type to a grower without consultation with a water chemistry or plant specialist;
    wherein said water type comprises Water Type 1, Water Type 2, Water Type 3, and/or Water Type 4, and further wherein:
        Water Type 1 comprises an alkalinity ranging from 0 to 60 ppm and a calcium concentration ranging from 0 to 60 ppm,
        Water Type 2 comprises an alkalinity ranging from 60 to 150 ppm and a calcium concentration ranging from 0 to 60 ppm,
        Water Type 3 comprises an alkalinity ranging from 150 to 200 ppm and a calcium concentration of greater than 50 ppm, and
        Water Type 4 comprises an alkalinity ranging from 200 to 240 ppm and a calcium concentration of greater than 50 ppm.

2. The method of claim 1, wherein said water type consists of Water Type 1, Water Type 2, Water Type 3, Water Type 4, or a combination thereof.

3. The method of claim 1, further comprising identifying a crop type and refining the fertilizer type determination based on the identified crop type.

4. The method of claim 1, wherein determining a water type is accomplished based on historical data in a given geographic region.

5. A computer readable storage medium encoded with a computer program for facilitating the selection of a fertilizer, wherein the computer program comprises executable instructions for:
    computing a water type based on geographic location data entered into said computer,
    determining at least one fertilizer based on said computed water type, and communicating said fertilizer determination to a user of the computer;
    wherein said water type comprises Water Type 1, Water Type 2, Water Type 3, and/or Water Type 4, and further wherein:
        Water Type 1 comprises an alkalinity ranging from 0 to 60 ppm and a calcium concentration ranging from 0 to 60 ppm,
        Water Type 2 comprises an alkalinity ranging from 60 to 150 ppm and a calcium concentration ranging from 0 to 60 ppm,
        Water Type 3 comprises an alkalinity ranging from 150 to 200 ppm and a calcium concentration of greater than 50 ppm, and
        Water Type 4 comprises an alkalinity ranging from 200 to 240 ppm and a calcium concentration of greater than 50 ppm.

6. The computer readable storage medium of claim 5, wherein said water type consists of Water Type 1, Water Type 2, Water Type 3, Water Type 4, or a combination thereof.

7. The computer readable storage medium of claim 5, wherein said computer program further comprises executable instructions for refining the fertilizer determination based on an identified crop type.

8. The computer readable storage medium of claim 5, wherein computation of a water type is accomplished based on historical data in a given geographic region.

9. The method of claim 1, wherein communicating said fertilizer type to the grower comprises providing a fertilizer to the customer based on said fertilizer type.

10. The method of claim 1, wherein the step of determining the at least one fertilizer type that is compatible with said computed water type comprises identifying a fertilizer packaging indicating the fertilizer is suitable for use with the determined water type.

* * * * *